UNITED STATES PATENT OFFICE.

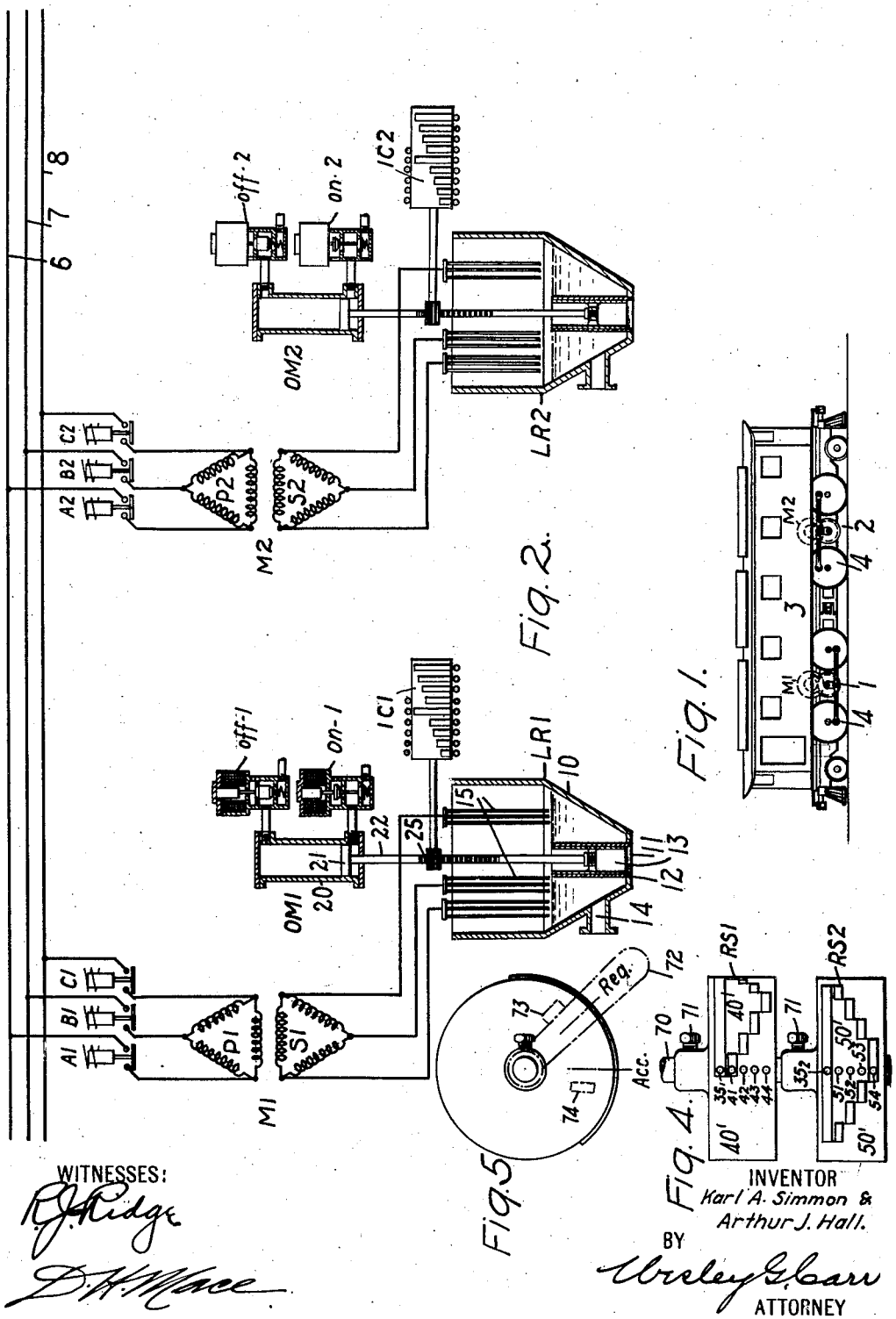

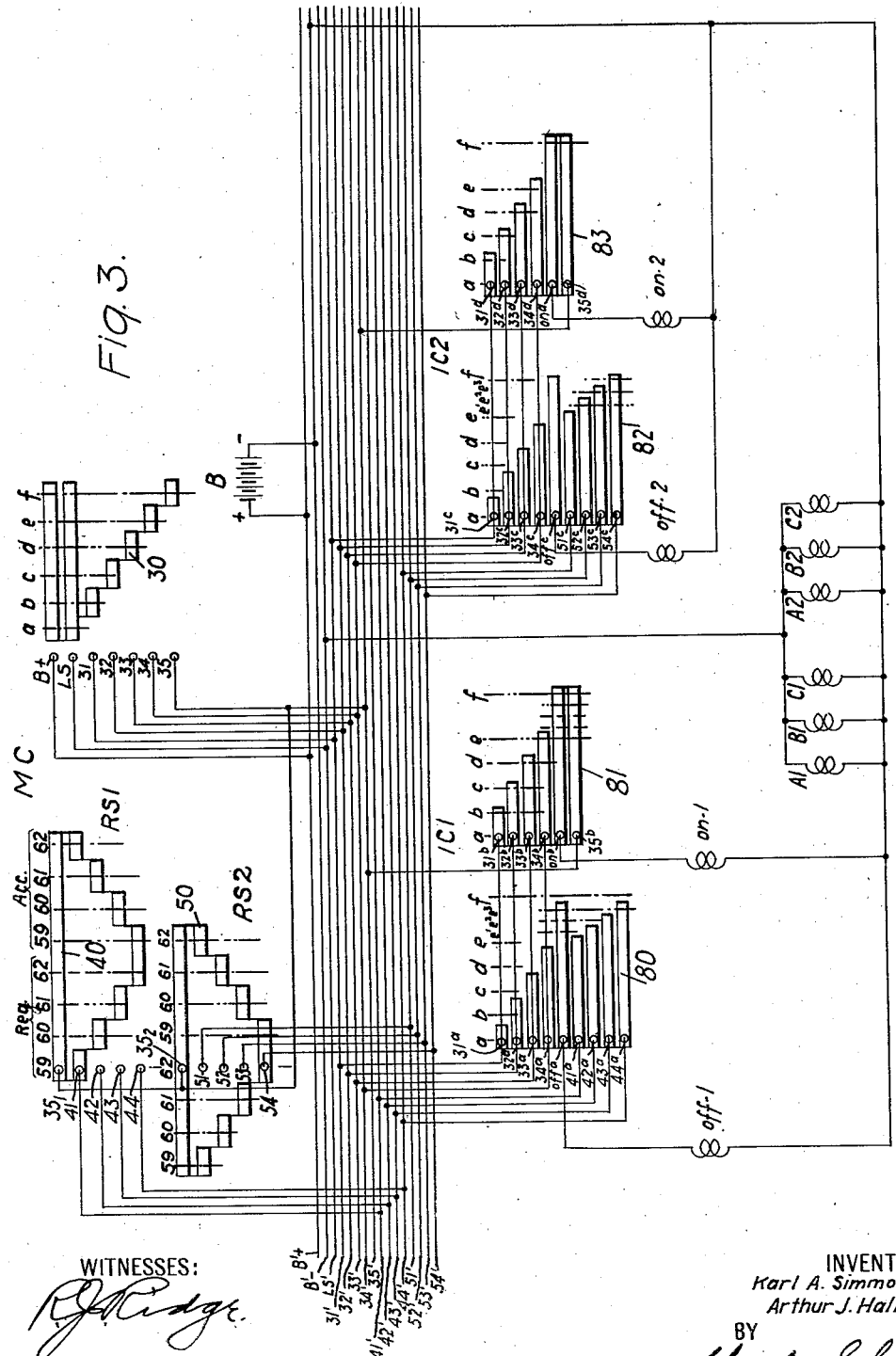

KARL A. SIMMON, OF EDGEWOOD PARK, AND ARTHUR J. HALL, OF WILKINSBURG, PENNSYLVANIA, ASSIGNORS TO WESTINGHOUSE ELECTRIC AND MANUFACTURING COMPANY, A CORPORATION OF PENNSYLVANIA.

CONTROL SYSTEM.

1,168,038.  Specification of Letters Patent.  Patented Jan. 11, 1916.

Application filed January 6, 1915. Serial No. 838.

*To all whom it may concern:*

Be it known that we, KARL A. SIMMON, a citizen of the United States, and a resident of Edgewood Park, in the county of Allegheny and State of Pennsylvania, and ARTHUR J. HALL, a subject of the King of Great Britain, and a resident of Wilkinsburg, in the county of Allegheny and State of Pennsylvania, have invented a new and useful Improvement in Control Systems, of which the following is a specification.

Our invention relates to control systems for dynamo-electric machines, and it has special reference to the control of such polyphase induction motors as are employed for propelling electric locomotives or other electric vehicles and such as are also adapted to be driven as generators by the load to regenerate energy for the supply circuits.

One of the objects of our invention is to provide a simple system for controlling the driving units or motors of an electric locomotive or train of electric vehicles which shall embody means for insuring a substantially uniform division of the load under heavy-load conditions, both during periods of acceleration when the motors are propelling the vehicle and during periods of regeneration when the motors are being driven as generators by the inertia of the vehicle and are regenerating energy for the supply circuits, and irrespective of the differences in the diameters of the driving wheels.

Another object of our invention is to provide a system of control of the above indicated class having manually adjustable means for modifying the operation of the system in accordance with differences in the driving-wheel diameters, whereby the total load may be proportionately divided between a plurality of motor-driven units which may constitute separately driven axles, motor-driven trucks, or even a plurality of half units constituting an electric locomotive.

A still further object of our invention is to provide a system of control for electric locomotives which embodies a plurality of electrically controlled liquid rheostats that are adapted for concurrent step-by-step operation in accordance with the manipulation of a master controller and, moreover, to provide an auxiliary manually adjustable switching device for arranging the control circuit connections to arrest the step-by-step movement of one of the liquid rheostats, under predetermined conditions, in order to compensate for the differences in driving-wheel diameters and to effect an equal distribution of the load between the driving units during both acceleration and regeneration.

More specifically stated, it is an object of our invention to provide a multiple-unit system, of the general character referred to, which shall embody a plurality of relatively-adjustable mechanically-connected auxiliary control-drums to be initially set or positioned with respect to each other, in accordance with the differences in driving wheel diameters, and adapted to be moved, as a single unit, into the one or the other of two operating positions that are respectively adapted for periods of motor acceleration and regeneration or dynamic braking, for the purpose of causing the load to be equally divided between the driving units.

When an electric locomotive or other vehicle is first placed in service and the driving wheels are, therefore, of equal diameters, the total load is equally shared by the several driving motors, during both acceleration and regeneration periods. However, after locomotives have been in service for sometime and some of the wheels have become badly worn, it is customary to turn them down to smaller diameters, and, as it frequently occurs that the wheels of both trucks do not wear correspondingly, the sizes of the driving wheels of the respective trucks are not alike. Under these conditions, the motor that is mechanically connected to the driving wheels of larger diameter becomes overloaded during accelerating periods, while the motor associated with the wheels of smaller diameter tends to carry the greater portion of the load during periods of regeneration or dynamic braking.

According to our invention, we propose to provide an auxiliary switching device that may be adjusted to suit the particular diameters of driving wheels upon a locomotive and which shall coöperate with the system in such a way as to correct for the inherent tendency of the motors to assume unbalanced loads during accelerating and regenerating braking periods. Moreover, our invention is not restricted to particular wheel diameters but may be adjusted from time to time, as the wheels are turned down to meet the existing operating conditions.

For illustrative purposes and for the sake of simplicity, we shall set forth our invention as embodying a pair of polyphase induction motors that are respectively associated with the trucks of a single locomotive unit and are governed by separately controlled liquid rheostats, although it should be understood that a pair of motors for each truck or that two half-units of a locomotive may be similarly adjusted and regulated.

In the accompanying drawings, Figure 1 is a view, in side elevation, of an electric locomotive for the control of which our invention is adapted; Fig. 2 is a diagrammatic view of the main circuit connections and control apparatus of a system of control embodying our invention; Fig. 3 is a diagrammatic view of the auxiliary control circuit connections and devices for governing the operation of the apparatus shown in Fig. 2, and Figs. 4 and 5 are, respectively, a view in elevation and a plan view of a portion of a structural embodiment of a part of the auxiliary control apparatus shown in Fig. 3.

Referring to the drawings, a plurality of polyphase induction motors M1 and M2 are respectively associated with a plurality of trucks 1 and 2 of an electric locomotive 3 and are mechanically connected to the driving wheels 4 of said trucks in a suitable manner, whereby the several motors serve to propel the locomotive when electrical energy is supplied thereto or are driven as generators by the locomotive under certain operating conditions. The motors M1 and M2 are adapted to be connected in parallel to a plurality of supply circuit conductors 6, 7 and 8 by means of electrically operated line switches A1, B1, C1 and A2, B2 and C2, respectively. Energy is supplied to primary windings P1 and P2 of said motors, while their secondary windings S1 and S2 are respectively connected to a plurality of liquid rheostats LR1 and LR2 through the agency of which the operation of the motors during acceleration and regeneration is governed in accordance with the manipulation of a master controller, as will hereinafter be fully set forth. The several liquid rheostats LR1 and LR2 are respectively operated by means of electro-pneumatic operating mechanisms OM1 and OM2 that have auxiliary interlock controllers IC1 and IC2 associated therewith. The liquid rheostats LR1 and LR2 are of like construction, and each comprises a tank 10 having a bottom discharge opening 11 to the edge of which is secured an upwardly projecting tubular member 12 that serves as a guide for a relatively movable tubular member or regulating valve 13. The regulating valve 13 is disposed within the guide member 12 and is adapted to be raised and lowered in position by the operating mechanism OM for the purpose of determining the height of the electrolyte within the tank 10, said electrolyte being continuously supplied thereto through an inlet opening 14. A plurality of electrodes 15 are disposed within the tank 10 and their lower ends are located at substantially the height of the upper end of the regulating valve 13, or the "flush-level", whereby the tips of the electrodes are partially immersed in the electrolyte. Obviously, the excess of electrolyte is continuously discharged through the regulating valve 13, so long as the "flush level" is maintained, and the electrolyte level may be raised to any desired height by correspondingly elevating the regulating valve 13 to a corresponding level.

The operating mechanisms OM1 and OM2 are also of like construction, and each comprises a cylinder 20 having a movable piston 21 disposed therein and rigidly connected to the movable regulating valve 13 of the associated rheostat by a member 22. The cylinder 20 is provided with a plurality of electrically operated magnet valves marked "Off" and "On" that are respectively adapted to govern the admission and release of an operating fluid from a suitable source (not shown) to and from the upper and lower ends of the cylinder. The "Off" valve, when deënergized, is opened to admit operating fluid above the piston 21 and to close a communication between the upper end of the cylinder 20 and the atmosphere, while, when energized, the supply of fluid is cut off, and the escape of the fluid within the cylinder is permitted. The "on" magnet valve differs slightly in that, when it is deënergized, its exhaust port is opened and its supply port closed, while the reverse conditions obtain when energy is supplied thereto.

From the foregoing description, it is evident that the piston 21 and the associated regulating valve 13 are initially maintained in their lowest positions, inasmuch as the unbalanced pressure acting upon the piston 21 is such as to force it in a downward direction. In the event that both "off" and "on" valves are energized, the reverse pressure conditions result, and the piston 21 and regulating valve 13 are raised. In order to arrest the movement of the regulating valve 13, it is only necessary to deënergize the "off" magnet valve and to energize the "on" valve, whereby balanced pressures acting upon the opposite sides of the piston 21 are secured, thereby holding the piston and regulating valve in whatever position they occupy.

For purposes of distinction, hereinafter the "off" and "on" magnet valves associated with the operating mechanism OM1 will be designated by employing the numeral 1 after their respective names, while the corresponding valves associated with the operating mechanism OM2 will be followed by the numeral 2, as "off—1" and "off—2". The auxiliary interlock controllers IC1 and IC2 may conveniently be of the rotatable-drum type and each is actuated in accordance with the movement of its respective operating mechanism OM through the agency of a rack and pinion connection 25, or other suitable means.

Reference may now be had to Fig. 3 which embodies a master controller MC and a plurality of regulating switches RS1 and RS2 that are respectively adapted to govern the operation of the operating mechanisms OM1 and OM2, whereby the liquid rheostats LR1 and LR2 may be governed accordingly.

The master controller MC comprises a movable conducting segment 30 and a plurality of stationary contact terminals B+, LS, 31, 32, 33, 34, and 35 which are adapted for coöperative engagement therewith upon the position-indicating lines $a$, $b$, $c$, $d$, $e$ and $f$ for the purpose of causing the operating mechanisms OM1 and OM2 to concurrently effect step-by-step movements of the regulating valves 13.

The regulating switch RS1 comprises a movable conducting segment 40 and a plurality of stationary contact terminals $35_1$, 41, 42, 43 and 44 that are adapted to be engaged by the segment 40 when it occupies any of its positions "Reg". or "Acc"., 59, 60, 61 and 62. The regulating switch RS2 is similar in construction and embodies a conducting segment 50 and a plurality of stationary contact terminals $35_2$, 51, 52, 53 and 54.

The several regulating switches RS1 and RS2 may be moved into any of their operative positions which have been designated by the numerals 59, 60, 61 and 62 that correspond to the diameters of the driving wheels 4 of the locomotive with which the system is employed. For instance, it is assumed that the driving wheels are initially 62 inches in diameter and the regulating switches RS1 and RS2 are adapted to compensate for such changes in the wheel diameters as are effected when the wheels are machined down to diameters of 61, 60 and 59 inches. Moreover, the switches RS1 and RS2 are adapted to occupy either a regeneration or an acceleration position, as "Reg". or "Acc"., in accordance with the character of the operation.

As shown in Fig. 3, the regulating switch RS1 is set or adjusted for 59 inch driving wheels associated with truck 1 of the locomotive, while the switch RS2 is adjusted for wheels of 62 inch diameter associated with the truck 2. Both regulating switches RS1 and RS2 occupy their positions "Reg"., and are therefore adapted for regenerative operation. While the several regulating switches RS1 and RS2 are adapted to accomplish their intended purposes in the forms shown in Fig. 3, in actual service it would be impractical to require the operator to move these switches to their proper positions for regeneration and acceleration by reason of the multiplicity of positions that are provided. For commercial service, therefore, the several movable conducting segments 40 and 50 are associated with a plurality of drums 40' and 50' which are mounted upon a single shaft 70 and are adapted for relative angular adjustments with respect the one to the other, being mechanically secured to the shaft by suitable set screws 71, as shown in Figs. 4 and 5. The shaft 70 is provided with an operating handle 72 by means of which the conducting segments 40 and 50 that are associated with the drums 40' and 50' may be moved into the one or the other of two operating positions "Reg". and "Acc". Stops 73 and 74 are provided for limiting the movement of the handle 72 and the associated drums.

In order to initially adjust the regulating switches RS1 and RS2 for the particular diameters of the locomotive driving wheels of the respective trucks, the drums 40' and 50' are set for their proper relative angular positions to correspond to the driving wheel diameters of the respective trucks. Having properly adjusted the regulating switches, it is only necessary for the operator to move the handle 72 to one of its extreme positions "Reg". during regenerative periods and to the other extreme position "Acc". for periods of motor acceleration.

Referring again to Fig. 3, the interlock controller IC1 comprises a plurality of movable conducting segments 80 and 81 that are adapted to occupy positions, $a$, $b$, $c$, $d$, $e$ and $f$ to respectively coöperatively engage stationary contact terminals $31^a$, $32^a$, $33^a$, $34^a$, off$^a$, $41^a$, $42^a$, $43^a$, $44^a$ and $31^b$, $32^b$, $33^b$, $34^b$, on$^b$ and $35^b$. The various positions of the interlock controller IC1 are determined by the operation of its associated operating mechanism OM1 by reason of the rack-and-pinion connection 25 between them. The conducting segments 80 and 81 of the interlock controller IC1 are so designed as to effect a step-by-step movement of the operating mechanism OM1 and to establish a plurality of definite electrolyte levels within the rheostat LR1 which correspond to the various positions of the interlock controller.

By reason of the fact that unbalanced loads on the motors are relatively unimportant when the total load is light and become of moment only under conditions of heavy total load, we make provision for compensating for the difference in wheel diameters only when the rheostats are substantially filled with electrolyte. Therefore, the last notch of the interlock controller IC1 is divided into three intermediate positions $e^1$, $e^2$, $e^3$. The interlock controller IC2 is similar in construction and operation to the controller IC1 and comprises a plurality of movable conducting segments 82 and 83 that are respectively adapted to coöperatively engage stationary contact terminals $31^c$, $32^c$, $33^c$, $34^c$, off$^c$, $51^c$, $52^c$, $53^c$, $54^c$ and $31^d$, $32^d$, $33^d$, $34^d$, on$^d$, and $35^d$.

Having set forth the construction of the various pieces of apparatus, the operation of the system will be described. Assuming therefore, the circuit connections and apparatus to be as shown and the locomotive to be coasting down grade at a speed which drives the motors M1 and M2 above their normal synchronous speed, the regenerative retardation operation is as follows: The master controller MC is first moved into its position $a$ in which a circuit is established from an auxiliary source of energy B which includes train line conductor B′+, terminal B+, conducting segment 30, terminal LS, train line conductor LS′ and, thence, in parallel through the energizing coils of the line switches A1, B1, C1 and A2, B2 and C2 to the B′− train line conductor. Upon the completion of the circuit just traced, the line switches A1, B1, C1 and A2, B2 and C2 are closed to supply energy from the supply circuit conductors 6, 7 and 8 to the primary windings P1 and P2 of the motors M1 and M2. The master controller MC is then moved into its position $b$, whence a circuit is completed from contact terminal B+ which includes conducting segment 30, terminal 31, train line conductor 31′ and thence, in branched circuits, to the respective stationary terminals $31^a$, $31^b$, $31^c$, and $31^d$ of the interlock controllers IC1 and IC2, from whence the parallel circuits are completed to the B′− train line conductor through the following circuits, one including conducting segment 80, terminal off$^a$, and energizing coil of the "off—1" magnet valve, a second circuit including conducting segment 81, terminal on$^b$, and energizing coil of "on—1" magnet valve, another circuit including conducting segment 82, terminal off$^c$, and energizing coil of the "off—2" magnet valve, and the last circuit traversing conducting segment 83, contact terminal on$^d$, and the energizing coil of the "on—2" magnet valve. Thus, the several magnet valves "off—1," "on—1," "off—2" and "on—2" are energized and accordingly actuated to admit operating fluid beneath the pistons 21 of the operating mechanisms OM1 and OM2 and to permit the exhaust thereof from the upper ends of the cylinders 20. The unbalanced pressures that are thus obtained act upon the pistons 21 to move them in an upward direction to raise the regulating valves 13 to correspondingly increase the level of the electrolyte within the rheostats LR1 and LR2. The secondary resistance of the motors M1 and M2 is, therefore, reduced and a regenerative load is placed upon the motors, which are now acting as generators, to dynamically retard the speed of the locomotive. The upward movement of the regulating valves 13 is, however, arrested as soon as the interlock controllers IC1 and IC2 reach their positions $b$ in which the energizing circuits of the "off" magnet valves are interrupted to permit said valves to assume their initial positions. Balanced pressures are, therefore, obtained on both sides of the movable pistons 21 and the regulating valves are brought to rest.

The regenerated load may be increased at the will of the operator by moving the master controller MC to any of its operative positions, either step-by-step or in a single movement. For purposes of explanation, it will be assumed that the master controller MC is moved to its position $e$, thereby energizing the contact terminal 34 and also the corresponding terminals $34^a$, $34^b$, $34^c$, $34^d$ of the respective interlock controllers IC1 and IC2. The several magnet valves "off—1", "off—2", "on—1" and "on—2" are therefore energized, as will be understood, and hence, the regulating valves 13 of the rheostats LR1 and LR2 will be raised concurrently until the interlock controllers reach their positions $e$, in which the contact terminals $34^a$ and $34^c$ become disengaged from the segments 80 and 82 and the valve magnets "off—1" and "off—2" deënergized to arrest further upward movement of the regulating valves. During this operation, the electrolyte gradually rises in the rheostats LR1 and LR2 and correspondingly decreases the resistance of the motor secondary circuits, thereby increasing the regenerated load upon the motors which are now acting as generators. Up to this point in the operation, the load is comparatively light and the unbalancing between the motors by reason of the differences in the diameters of the driving wheels of the respective trucks is inappreciable. Therefore, the regulating switches RS1 and RS2 perform no function in the operation of the system. These switches, however, are brought into operation for the last few inches of electrolyte rise which corresponds to the step between the interlock controller positions $e$ and $f$. If it is desired to further increase the regenerated load upon the motors M1 and M2, the master controller MC is moved into position $f$, thereby energizing the contact terminal 35 and train line conductor 35′ from whence a divided circuit is completed, one branch of which includes terminals 35ᵇ and onᵇ which are bridged by the conducting segment 81 of the controller IC1 and thence through the energizing coil of the magnet valve "on—1" to the B'- conductor; another branch traverses contact terminals 35ᵈ and onᵈ which are bridged by conducting segment 83 of controller IC2 and energizing coil of magnet valve "on—2" to conductor B'-; and a third circuit, which itself is branched, is interlocked through the regulating switches RS1 and RS2. One branch of this last mentioned circuit includes contact terminals 35₁ and 41 that are bridged by the conducting segment 40 of switch RS1 in its position "Reg". 59, and thence through train line conductor 41' to contact terminals 41ᵃ and offᵃ which are bridged by conducting segment 80 of interlock controller IC1 and energizing coil of magnet valve "off—1". The other branch includes contact terminal 35₂ and 54 that are bridged by conducting segment 50 of regulating switch RS2 into its position "Reg". 62, train line conductor 54', contact terminal 54ᶜ, conducting segment 82, contact terminal offᶜ and energizing coil of magnet valve "off—2" to the B'- conductor. The magnet valves "off—1", "off—2", "on—1" and "on—2" are thus energized, and the operating mechanisms OM1 and OM2 effect the upward movements of their associated regulating valves 13 until the interlock controllers IC1 and IC2 reach positions in which the "off—1", and "off—2" magnet valves are deënergized.

By reason of the setting of the regulating switch RS2 for 62 inch driving wheels, the operating mechanism OM2 is permitted to raise the electrolyte level in the liquid rheostat LR2 to its full height which corresponds to position $f$ of the interlock controller IC2. However, since the regulating switch RS1 is adjusted for 59 inch driving wheels, the upward movement of the operating mechanism OM1 is arrested as soon as the interlock controller IC1 reaches its intermediate position $e^1$, in which the contact terminal 41ᵃ becomes disengaged from conducting segment 80 and the energizing coil of the magnet valve "off—1" is deënergized. It is evident, therefore, that the motor M1 which is mechanically connected to the smaller or 59 inch driving wheels and which, therefore, would naturally tend to take the greater part of the generated load, is restricted in its loading, while motor M2 that is associated with the larger or 62 inch driving wheels is permitted to be loaded to the capacity of the rheostat LR2. If, therefore, the apparatus is properly designed to meet the operating conditions, the total load may be caused to be divided equally between the several motors M1 and M2, irrespective of the difference in driving wheel diameters.

The mode of operation during periods of acceleration is similar in every respect to that just described, with the exception that the regulating switches RS1 and RS2 are moved to their corresponding "Acc". positions 59 and 62, in which the control circuit connections are re-arranged to permit the rheostat LR1 to be completely filled, while the level of the electrolyte in rheostat LR2 is limited to correspond to intermediate positions $e^1$. The reversal of operating conditions, so far as the actuation of the rheostats LR1 and LR2 is concerned, is necessary by reason of the inherent tendency of the motor associated with the larger driving wheels to carry an excess share of the total load.

Obviously, the regulating switches RS1 and RS2 may be relatively adjusted to meet the requirements of any other driving wheel diameters for which they are designed, and, when so adjusted, the operation of the rheostats LR1 and LR2 are regulated to effect an equal distribution of load between the motors M1 and M2 during the last steps of the rheostat operation for periods of regeneration and acceleration.

Many modifications in the structural details and arrangement and location of parts and circuit connections may be effected without departing from the spirit and scope of our invention, and such modifications are intended to be covered in the appended claims.

We claim as our invention:

1. In a control system for electric vehicles, the combination with a plurality of electric driving motors, a plurality of rheostats for governing the operation of said motors, and means for controlling the operation of said rheostats during acceleration and regeneration, of auxiliary means coöperating with said control means for adapting said control means for periods of acceleration and regeneration and for compensating for differences in wheel diameters of the vehicle.

2. In a control system for electric vehicles, the combination with a plurality of electric driving motors, a plurality of rheostats for governing the operation of said motors, and means for controlling the operation of said rheostats during acceleration and regeneration, of manually adjustable means associated with said control means for effecting relative adjustment of the operation of the respective rheostats in accordance with differences in the diameters of the driving wheels of the vehicles.

3. In a control system for electric vehicles, the combination with a plurality of electric driving motors, a plurality of rheostats for governing the operation of said motors, and means for controlling the operation of said rheostats during acceleration and regeneration, of a plurality of switching devices associated with said control means and with the respective rheostats for independently adjusting the operation of the respective rheostats to compensate for differences in driving wheel diameters for both acceleration and regeneration.

4. In a control system, the combination with a source of energy, a plurality of induction motors connected thereto, and a plurality of electrically controlled liquid rheostats for severally governing the operation of said motors, of control means embodying a master controller for concurrently effecting step-by-step actuations of said liquid rheostats, and auxiliary control switching means coöperating with said control means for limiting the operation of the respective rheostats during periods of acceleration and regeneration.

5. In a control system for electric vehicles, the combination with a source of energy, a plurality of induction motors connected thereto, and a plurality of electrically controlled liquid rheostats for severally governing the operation of said motors, of control means, including a master controller, for concurrently effecting step-by-step actuations of said liquid rheostats, and adjustable auxiliary means for modifying the action of said control means and discontinuing the step-by-step operation of one rheostat before the other to compensate for differences in diameters of the driving wheels.

6. In a control system for electric vehicles, the combination with a source of energy, a plurality of induction motors connected thereto, and a plurality of electrically controlled liquid rheostats for severally governing the operation of said motors, of control means, embodying a master controller, for concurrently effecting step-by-step actuations of said liquid rheostats, and separate adjustable means for independently restricting the operation of the respective rheostats to effect a balance in loads upon said motors when the driving wheels associated therewith differ in diameter.

7. In a vehicle, the combination with a plurality of electric motors mechanically connected to driving wheels of the vehicle, and means for controlling the concurrent operation of said motors, of manually operated adjusting means associated with said control means for directly influencing the action of said control means and effecting a balance of motor loads by compensating for differences in diameters of the driving wheels.

8. In a control system for electrically propelled vehicles, the combination with a plurality of dynamo-electric machines adapted to be operated as motors or as generators, and a plurality of rheostats for severally governing the operation of said machines, of electrical means for controlling the operation of said rheostats, and adjustable means associated with said electrical controlling means for severally determining the operation of the respective rheostats during periods of acceleration and regeneration to compensate for differences in diameters of the driving wheels.

9. In a vehicle, the combination with a plurality of induction motors mechanically connected to the vehicle driving wheels and adapted to be driven as generators, a plurality of electro-pneumatically operated liquid rheostats for governing the operation of said motors, and electrical means, embodying a master controller, for effecting the concurrent actuation of said liquid rheostats, of a plurality of relatively adjustable mechanically associated controllers adapted to occupy one position for acceleration and another for regeneration to relatively effect the operation of said liquid rheostats and compensate for differences in the driving-wheel diameters.

10. In a vehicle, the combination with a plurality of driving motors mechanically connected to the driving wheels, and means for controlling the concurrent operation of said motors during periods of acceleration and regeneration, of auxiliary means embodying a plurality of mechanically associated and relatively adjustable control drums adapted to occupy different positions for acceleration and regeneration to compensate for differences in driving wheel diameters and effect a predetermined division of load between the motors under all conditions of operation.

In testimony whereof, we have hereunto subscribed our names this 31st day of December, 1914.

KARL A. SIMMON.
ARTHUR J. HALL

Witnesses:
L. G. RILEY,
B. B. HINES.